United States Patent [19]

Vaahs et al.

[11] Patent Number: 5,030,702

[45] Date of Patent: Jul. 9, 1991

[54] POLYSILAZANES, PROCESSES FOR THEIR PREPARATION, CERAMIC MATERIALS WHICH CONTAIN SILICON NITRIDE AND CAN BE PREPARED FROM THEM, AND PREPARATION THEREOF

[75] Inventors: Tilo Vaahs, Kelkheim; Hans-Jerg Kleiner, Kronberg/Taunus; Marcellus Feuckert; Martin Brück, both of Hofheim am Taunus, all of Fed. Rep. of Germany

[73] Assignee: Hoechst Aktiengesellschaft, Frankfurt am Main, Fed. Rep. of Germany

[21] Appl. No.: 496,856

[22] Filed: Mar. 21, 1990

Related U.S. Application Data

[63] Continuation of Ser. No. 279,402, Dec. 2, 1988, Pat. No. 4,946,920.

[51] Int. Cl.$^5$ .............................................. C08G 77/04
[52] U.S. Cl. ................................... 528/33; 264/29.1; 264/29.2; 264/29.6; 264/56; 264/60; 427/228; 501/92
[58] Field of Search ......................... 427/228; 501/92; 264/29.1, 29.2, 29.6, 56, 60; 528/33

[56] References Cited

U.S. PATENT DOCUMENTS

| | | |
|---|---|---|
| 4,404,153 | 9/1983 | Gaul, Jr. ................................ 528/31 |
| 4,725,660 | 2/1988 | Serita et al. ........................... 528/28 |
| 4,835,238 | 5/1989 | Burns ..................................... 528/28 |

Primary Examiner—Melvyn I. Marquis

[57] ABSTRACT

Polysilazanes, processes for their preparation, ceramic materials which contain silicon nitride and can be prepared from them, and preparation thereof.

The invention relates to novel polysilazanes, their preparation, their further processing to ceramic material containing silicon nitride and this material itself. To prepare the polysilazanes, Si,Si'-diorganyl-N-alkyltetrachloro-disilazanes of the formula $RSiCl_2$-$NR'$-$SiCl_2R$ are reacted with ammonia. The polysilazanes can then be pyrolyzed to ceramic material containing silicon nitride. The polysilazanes according to the invention dissolve in the customary aprotic solvents.

10 Claims, No Drawings

POLYSILAZANES, PROCESSES FOR THEIR PREPARATION, CERAMIC MATERIALS WHICH CONTAIN SILICON NITRIDE AND CAN BE PREPARED FROM THEM, AND PREPARATION THEREOF

This application is a division of application Ser. No. 07/279,402, filed Dec. 2, 1988 now U.S. Pat. No. 4,946,920.

The present invention relates to novel polysilazanes, their preparation, their further processing to ceramic material containing silicon nitride and this material itself. The ceramic material containing silicon nitride is obtained from the polysilazanes by pyrolysis and for the major part consists of silicon nitride containing portions of silicon carbide and carbon.

The pyrolysis of polysilazanes to give ceramic material containing silicon nitride-SiC has already been described in the literature (R. R. Wills et al., Ceramic Bulletin, Volume 62 (1983), 904–915).

Chlorosilanes are as a rule used as starting materials for the preparation of polysilazanes, and these starting materials are reacted with ammonia or primary or secondary amines or with disilazanes (U.S. Pat. Nos. 4,540,803, 4,543,344, 4,535,007, 4,595,775, 4,397,828 and 4,482,669).

Another method for the preparation of polysilazanes comprises reacting aminosilanes with excess ammonia or excess primary amine. The aminosilanes are in turn prepared by reaction of chlorosilanes with amines (FR-A1-2,583,423). For example, tetrakis(methylamino)silane $Si(NHCH_3)_4$ is formed from tetrachlorosilane $SiCl_4$ and methylamine:

$$SiCl_4 + 8CH_3NH_2 = Si(NHCH_3)_4 + 4CH_3NH_3Cl$$

The aminosilane is then reacted with excess ammonia, all the methylamino groups being replaced by NH groups. Viscous to highly viscous polysilazanes which can be pyrolyzed in a ceramic yield 72-79% by weight to give material containing silicon nitride are formed.

The disadvantage of this process is the use of large amounts of alkylamine, half of which then precipitates as alkylamine hydrochloride during preparation of the aminosilane. The polymers prepared from the aminosilane are viscous and can therefore be processed only with difficulty; production of fibers is not possible. There was therefore the object of discovering a simple process which leads to solid polysilazanes which are soluble in customary solvents and/or are fusible and can therefore be spun from solution and/or from the melt. The present invention achieves this object.

The present invention relates to a process for the preparation of polymeric silazanes, which comprises reacting one or more Si,Si'-diorganyl-N-alkyl-tetrachloro-disilazanes of the formula $RSiCl_2-NR'-SiCl_2R$, in which R is $C_1-C_4$-alkyl, vinyl or phenyl and R' is $C_1-C_4$-alkyl, with at least 6.7 moles of ammonia per mole of chlorodisilazane in a solvent at temperatures from $-80°$ C. to $+70°$ C. Preferably, R is methyl, ethyl, vinyl or phenyl and R' is methyl. In particular, R is ethyl and R' is methyl.

The Si,Si'-diorganyl-N-alkyl-tetrachloro-disilazanes $RSiCl_2-NR'-SiCl_2R$ (also called "chlorodisilazanes" below) used as starting substances for the polymeric silazanes are known for $R=R'=$methyl from the following publications J. Silbiger et al., Inorg. Chem. 6 (1967) 399;
H. Nöth et al., Chem. Ber. 107 (1974) 518; and
J. P. Mooser et al., Z. Naturforschung 29b (1974) 166.

The chlorodisilazanes required for the process according to the invention can be obtained by the following method:

One or more organyltrichlorosilanes $RSiCl_3$, in which R stands for alkyl groups having 1 to 4 carbon atoms or for vinyl or phenyl, are reacted with monoalkylamine $R'NH_2$, in which R' stands for alkyl groups having 1 to 4 carbon atoms. The reaction is carried out in aprotic solvents, preferably polar solvents, such as ethers, and in particular in THF. The temperature here is $-10°$ to $+70°$ C.

The molar ratio of organyltrichlorosilane to alkylamine should assume values of between 0.3:1 and 1:1, and a molar ratio of 0.5:1 to 0.7:1 is preferred. The reaction equation is:

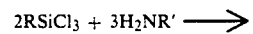

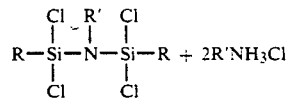

The ammonium salts formed during the reaction precipitate out of the reaction solution, whilst the chlorodisilazanes formed remain in solution.

According to the invention, the chlorodisilazanes are reacted with at least 6.7 moles, preferably with at least 7 moles, of ammonia per mole in aprotic solvents, preferably polar solvents, such as ethers, in particular tetrahydrofuran.

This reaction is carried out at temperatures between $-80°$ C. and $+70°$ C., preferably at $-10°$ C. to $0°$ C.

In this reaction, an ammonia molecule first reacts with two SiCl functions to form an NH bridge:

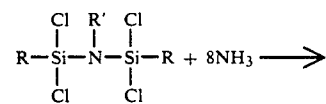

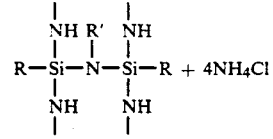

The maximum crosslinking is thereby already achieved, since the alkylamino bridge is bonded to two further silicon atoms like an NH grouping. Partial replacement of the NR' groups by NH groups then occurs. This means that the carbon content of the polymer decreases, which is desirable in view of the preparation of an $Si_3N_4$ ceramic:

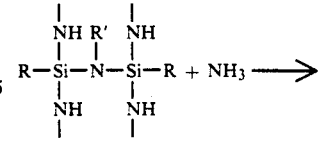

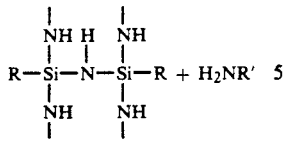

However, as stated, not all the alkylamino bridges are displaced, and NR' groupings remain in the polysilazane. The novel polymeric silazanes formed dissolve completely in all the customary aprotic solvents. They have the following structural units:

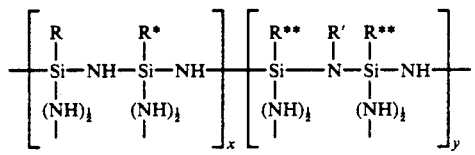

where $x+y=1$. Although the same radicals are possible here for R*, R and R* as for R, R, R*, R and R* can be identical or different (different if a mixture of several chlorodisilazanes is reacted with ammonia).

The silicon atoms here are always bonded to other silicon atoms via NH or NR' bridges, and no direct Si—Si bonds are formed.

Values of $x=0.7$-$0.95$ ($y=0.3$-$0.05$) are obtained when at least 6.7 moles of $NH_3$ are used per mole of chlorodisilazane. Preferably, $x=0.85$-$0.95$ ($y=0.15$-$0.05$); this is the case if at least 7 moles of $NH_3$ are used per mole of chlorodisilazane. In general, not more than 16 moles and preferably not more than 12 moles of $NH_3$ are used per mole of chlorodisilazane. A larger relative amount of $NH_3$ than 16 moles is of course also successful, but this greater expenditure is superfluous.

The present invention also accordingly relates to polymeric silazanes of the general formula

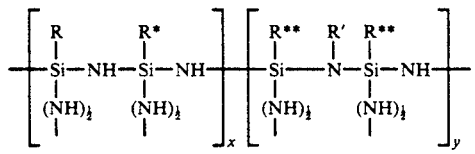

in which R, R*, R and R* can be identical or different and R, R*, R and R* are $C_1$-$C_4$-alkyl, vinyl or phenyl, R' is $C_1$-$C_4$-alkyl and x and y denote the molar fractions of the two structural units, $x+y$ being 1 and x being 0.7-0.95. Here again, preferably, R, R*, R and R* are methyl, ethyl, vinyl or phenyl and R' is methyl; particularly preferably, R, R*, R and R* are ethyl and R' is methyl.

The present invention furthermore relates to polymeric silazanes which can be obtained by reacting one or more Si,Si'-diorganyl-N-alkyl-tetrachloro-disilazanes of the formula $RSiCl_2$-$NR'$-$SiCl_2R$, in which R is $C_1$-$C_4$-alkyl, vinyl or phenyl and R' is $C_1$-$C_4$-alkyl, with at least 6.7 moles of ammonia per mole of chlorodisilazane in a solvent at temperatures from $-80°$ C. to $+70°$ C.

The structural formula of the polymeric silazanes according to the invention shows that their relative content of nitrogen is unavoidably hih: the ratio of silicon to nitrogen has values of between 1:1.3 and 1:2.

In $Si_3N_4$, this ratio is 1:1.33, so that the correct ratio of silicon and nitrogen for the silicon nitride ceramic can easily be established by splitting off ammonia during the pyrolysis of the polysilazanes.

The formation of elemental silicon during the pyrolysis is in this way prevented. This is a great difficulty in the process described by D. Seyferth, G. H. Wiseman and C. Prud'homme (U.S. Pat. No. 4,397,828, J. Amer. Ceram. Soc. 66, (1983) C 13), which starts from dichlorosilane $H_2SiCl_2$ and ammonia and leads to a polysilazane with an Si:N ratio of 1:1. Pyrolysis of such polysilazanes gives $\alpha$- and $\beta$-$Si_3N_4$, and the excess of silicon in the polysilazane appears as elemental silicon in the ceramic.

The nitrogen-rich polysilazanes according to the invention can be converted by pyrolysis into amorphous dense materials which contain silicon nitride and can also contain traces of H and O.

The present invention thus also relates to a process for the preparation of ceramic material containing silicon nitride, which comprises pyrolyzing the polymeric silazanes defined above by their structural formula or by the process for their preparation, in an inert atmosphere at 800° to 1400° C. The inert atmosphere here can consist of $N_2$, Ar or He, $N_2$ or Ar preferably being used.

Partly amorphous, microcrystalline ceramic materials which contain $\alpha$-$Si_3N_4$ as a crystalline phase are formed at pyrolysis temperatures above 1200° C., for example in the range from 1200° C. to 1400° C.

A particular advantage is that the polysilazanes can be shaped into three-dimensional shaped articles by various processes before the pyrolysis. The simplest method of shaping is pressing of articles (monoaxial or isostatic pressing) described in Example 1. Other shaping processes, such as slip casting, extrusion and the like, are also possible.

An important method of shaping is drawing off fibers from the polysilazanes. Fibers can be drawn in this way from highly viscous solutions of a polysilazane in solvents such as toluene, tetrahydrofuran or hexane; in the case where for example, R, R*, R and R* are ethyl, R' is methyl and x is 0.85 to 0.95, they can also be drawn from viscous melts of the polysilazane as well as from solutions. Drawing of fibers is advantageously effected through spinnerets of 80 to 150 μm diameter. The fiber is narrowed by subsequent stretching, so that a very strong fiber of 2 to 20 μm, in particular 5–15 μm diameter is formed after the pyrolysis. If the fiber is spun from a solution, it is first dried in air or an inert gas after stretching. If it is spun from the melt, the melt temperature generally being, for example, 60° to 150° C., the fiber is further crosslinked for a short time in air or ammonia at room temperature after stretching, so that it does not disintegrate durin subsequent pyrolysis. The fibers produced by pyrolysis are used as mechanical reinforcing inforcing inclusions in fiber-reinforced aluminum, aluminum alloys and ceramic components.

Another important processin possibility for the polysilazanes according to the invention is the production of dense, firmly adhering, amorphous or microcrystalline ceramic coatings on metals, in particular steels, or on ceramics, such as $Al_2O_3$, $ZrO_2$, MgO, SiC or silicon nitride.

The coating operation is carried out with the aid of a solution of the polysilazane in organic solvents such as toluene, tetrahydrofuran or hexane. If R, R*, R and R* are ethyl, R' is methyl and x is 0.85 to 0.95, the polysilazane is fusible and coating can also be carried out by means of a melt by dipping of the article to be coated, as well as by means of a solution of the polysilazane. Pyrolytic conversion into an amorphous or microcrystalline layer is carried out in the safe temperature range of 800° to 1200° C., or 1200° C. to 1400° C., under an inert gas as described for three-dimensional shaped articles.

Because of their outstanding adhesion, good hardness and surface quality, the ceramic coatings are particularly suitable for surface-finishing of machinery components subjected to mechanical and chemical stresses.

The fusible polysilazanes where R, R*, R and R* are ethyl, R' is methyl and x is 0.85-0.95 can also be melted and then cast in any desired casting molds. Because of the high ceramic yield of 70 to 90% by weight, these castings can be converted by pyrolysis with a very slow temperature program of heating up into amorphous, microcrystalline or crystalline ceramic shaped articles which are virtually free from cracks and pores.

The polysilazanes according to the invention can furthermore also be pyrolyzed in an $NH_3$ atmosphere, instead of in an inert gas, with an equally high ceramic yield of 70-90% by weight. A glass-clear colorless material which is virtually free from carbon results from this process. The C content is less than 0.5% by weight in the case of pyrolysis in $NH_3$ at 1000° C. or higher. Depending on the pyrolysis temperature, the pyrolysis product is composed of virtually pure amorphous silicon nitride (pyrolysis below 1200° C.) or crystalline silicon nitride (pyrolysis above 1250° C., preferably above 1300° C.).

The pyrolysis in $NH_3$ can be applied to all the shaped articles produced by the shaping processes described above, that is to say shaped articles, fibers, coatings and castings of polysilazane.

The polysilazanes described can also be mixed with other ceramic powders, such as, for example, $Al_2O_3$, BN, SiC, $Si_3N_4$ and the like, further processed together with these and finally sintered. Novel composite materials with improved mechanical, thermal or chemical properties are formed here.

EXAMPLE 1

32.1 g (=0.125 mole) of Si,Si'-dimethyl-N-methyl-tetrachlorodisilazane were dissolved in 600 ml of dry tetrahydrofuran in a 1 l three-necked flask with a cold finger and stirring device. The cold finger was cooled to −78° C. and the solution was cooled to −10° C. 25.5 g (=1.5 moles) of ammonia were then added so that the internal temperature did not rise above −5° C.

The ammonium salts were then removed and the solvent was distilled off at 20° C. under reduced pressure. During this procedure, the residue became solid and foamed during drying. 14.2 g of polysilazane were obtained.

The $^1$H-NMR in $CDCl_3$ showed the $N(CH_3)$ resonances between 2.6 and 2.2 ppm, the NH resonances between 0.3 and 1.25 ppm and the $Si(CH_3)$ resonances between +0.25 and −0.1 ppm as broad signal ranges. The intensities of $Si(CH_3):NH:N(CH_3)$ were 3:1.5:0.14. This means that the following distribution of monomer units was present:

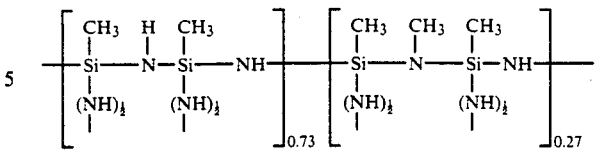

The polysilazane had an average molar mass of 1100 g/mol. A porous article of $10\times10\times10$ mm$^3$ was pressed from the polysilazane under 3000 bar and pyrolyzed at 1000° C. in nitrogen for 1 hour. The ceramic yield was 70% by weight.

Elemental analysis: N 28.2% by weight Si 38.5% by weight H 6.5% by weight C 20.6% by weight

EXAMPLE 2

74.1 g (=0.26 mole) of Si,Si'-diethyl-N-methyl-tetrachlorodisilazane were dissolved in 800 ml of dry tetrahydrofuran under a nitrogen atmosphere in a 1 l three-necked flask which had a blade stirrer and was surmounted by a dry ice condenser. The cold finger was cooled to −78° C. and the solution was cooled to −10° C.

Finally, 30.9 g (=1.82 mole) of ammonia were added so that the internal temperature did not rise above 0° C.

The ammonium chloride was then removed and all the volatile constituents were distilled off under reduced pressure at 20° C. After all the tetrahydrofuran had been pumped off, 28.2 g of a soft substance which was completely soluble in the customary aprotic solvents were obtained.

The $^1$H-NMR in $CDCl_3$ showed two separate signal ranges: on the one hand the N-methyl groups and on the other the overlapping of the ethyl and NH signal groups with intensities of 0.6:12.8. This gives the formula:

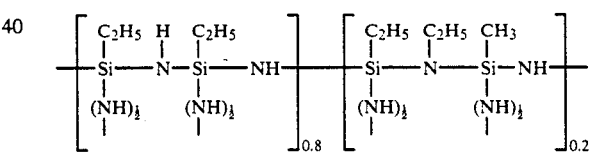

A ceramic yield of 73% by weight was found on pyrolysis in nitrogen at 1000° C.

EXAMPLE 3

32.3 g (=0.115 mole) of Si,Si'-divinyl-N-methyl-tetrachlorodisilazane were dissolved in 500 ml of tetrahydrofuran in a 1 l three-necked flask with a cold finger and stirring device. The cold finger was cooled to −78° C. and the solution was cooled to −10° C. Ammonia was then added so that the internal temperature did not rise above −5° C. The total amount of ammonia was 23.5 g (=1.38 mole).

When the reaction had ended, the ammonium chloride which had precipitated was removed and the solvent was distilled off under reduced pressure at 20° C.

After all the tetrahydrofuran had been pumped off, 10.5 g of a solid which was soluble in all the customary aprotic solvents were obtained.

The $^1$H-NMR in $CDCl_3$ showed separate signal ranges for the vinyl and the N-methyl and NH groups with intensities of 6:0.9:3.4. This gave the following distribution of monomer units:

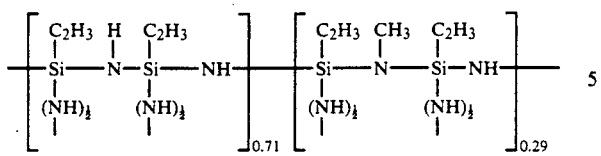

EXAMPLE 4

35 ml (44.5 g; 0.275 mole) of vinyltrichlorosilane were dissolved in 600 ml of dry tetrahydrofuran in a 1 l three-necked flask with a cool finger and stirring device. The cool finger was cooled to $-78°$ C. (dry ice) and the reaction solution was cooled to $-10°$ C. 12.8 g (0.41 mole) of methylamine and then 16.4 g (0.96 mole) of ammonia were subsequently passed in so that the internal temperature did not rise above 0° C.

The ammonium chlorides were filtered off with suction and the volatile constituents of the filtrate were distilled off at 20° C. under reduced pressure.

This gave a 66% strength solution of the polysilazane in tetrahydrofuran, which was used in accordance with claim 13 for coatings on $Al_2O_3$.

The $^1$H-NMR spectrum in $CDCl_3$ showed the following chemical shifts:
Si-vinyl: $\delta = 5.5$–$6.2$ ppm intensity: 16.3
N-methyl: $\delta = 2.25$–$2.55$ ppm intensity: 3
NH: $\delta = 0.5$–$1.3$ ppm intensity: 8.5

EXAMPLE 5

A mixture of 38.1 ml (48.5 g; 0.3 mole) of vinyltrichlorosilane and 35.3 ml (44.8 g; 0.3 mole) of methyltrichlorosilane in 700 ml of dry tetrahydrofuran was dissolved in a 1 l three-necked flask with a cold finger and stirring device. The cold finger was cooled to $-78°$ C. and the reaction solution was cooled to $-10°$ C. 27.9 g (0.9 mole) of methylamine were then passed in. The methylamine hydrochloride formed precipitated out of the reaction solution during this procedure.

35.7 g (2.1 mole) of ammonia were then passed in. When passing in the methylamine and ammonia, it was ensured that the internal temperature did not exceed 0° C.

Finally, the ammonium chlorides which had precipitated were filtered off with suction and all the volatile constituents were distilled off under reduced pressure at about 20° C. This gave a colorless viscous liquid which still contained tetrahydrofuran.

A white dry solid was obtained on further drying using a vacuum pump (34.2 g).

The $^1$H-NMR in $CDCl_3$ showed the following chemical shifts:
Si-vinyl: $\delta = 5.5$–$6.3$ ppm intensity: 10
N-methyl: $\delta = 2.2$–$2.6$ ppm intensity: 1.5
NH: $\delta = 0.6$–$1.4$ ppm intensity: 8
Si-methyl: $\delta = 0$–$0.5$ ppm intensity: 10
Elemental analysis: N 23.1% by weight, Si 34.4% by weight.

We claim:

1. A process for the preparation of ceramic material containing silicon nitride, which comprises pyrolyzing a polymeric silazane of the formula

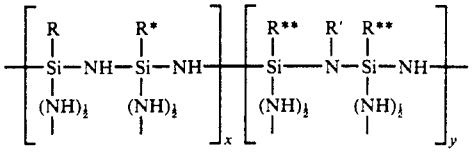

in which R, R*, R and R* can be identical or different and R, R*, R and R* are $C_1$–$C_4$-alkyl, vinyl or phenyl, R' is $C_1$–$C_4$-alkyl and x and y denote the molar fractions of the two structural units, x+y being 1 and x being 0.7–0.95 in an inert atmosphere at 800° to 1400° C.

2. The process as claimed in claim 1, wherein to produce ceramic fibers containing silicon nitride, the polymeric silazane is first dissolved in an organic solvent, fibers are drawn from this solution and these are pyrolyzed after the solvent has been evaporated off.

3. The process as claimed in claim 1, wherein to produce a ceramic shaped article containing silicon nitride, the pulverulent polymeric silazane is pressed to a shaped article before the pyrolysis.

4. The process as claimed in claim 1, wherein to produce a ceramic coating containing silicon nitride, the polymeric silazane is first dissolved in an organic solvent, the coating process is carried out with this solution and the coating is pyrolyzed, after the solvent has been evaporated off.

5. A process for the production of ceramic fibers containing silicon nitride, which comprises melting a polymeric silazane of the formula

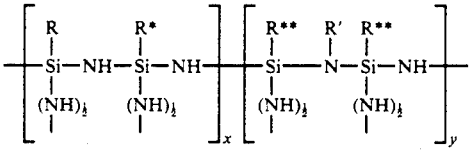

in which R, R*, R and R* are ethyl and R' is methyl, x and y denote the molar fractions of the two structural units, x+y being 1 and x being 0.7–0.95, drawing fibers from the melt at 60° to 100° C., rendering these non-fusible with air and the pyrolyzing the product at 800° to 1400° C. in an inert atmosphere.

6. A process for the production of a ceramic shaped article containing silicon nitride, which comprises melting a polymeric silazane of the formula

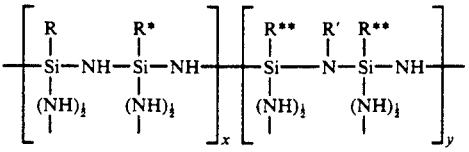

in which R, R*, R, and R* are ethyl and R' is methyl, x and y denote the molar fractions of the two structural units, x+y being 1 and x being 0.7–0.95, processing the melt by casting, injection molding or extrusion to give a shaped article, rendering this non-fusible with air or $NH_3$ and then pyrolyzing the product at 800° to 1400° C. in an inert atmosphere.

7. The process as claimed in claim 1, wherein the pyrolysis is carried out at 800°–1200° C.

8. The process as claimed in claim 1, wherein the pyrolysis is carried out at 1200°–1400° C.

9. A ceramic material containing silicon nitride, obtainable by the process as claimed in claim 1.

10. A process for the preparation of ceramic material containing silicon nitride, which comprises pyrolizing a polymeric silizane of the formula

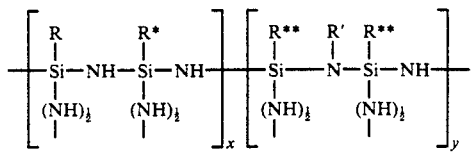

in which R, R*, R, and R* can be identical or different and R, R*, R and R* are $C_1$–$C_4$-alkyl, vinyl or phenyl, R' is $C_1$–$C_4$-alkyl and x and y denote the molar fractions of the two structural units, x+y being 1 and x being 0.7–0.95, in an $NH_3$ or $N_2/H_2$ atmosphere at 800° C. to 1400° C.

* * * * *

UNITED STATES PATENT AND TRADEMARK OFFICE
CERTIFICATE OF CORRECTION

PATENT NO. : 5,030,702

DATED : 7/9/91

INVENTOR(S) : Tilo Vaahs, Hans-Jerg Kleiner, Marcellus Feuckert and Martin Brück It is certified that error appears in the above-identified patent and that said Letters Patent is hereby corrected as shown below:

In column 3, at line 18 and at line 43 the formula should read:

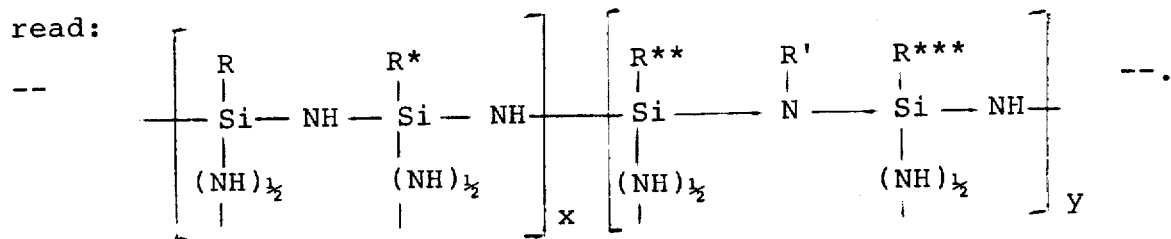

In column 3, line 67, "hih" should read --high--.

In column 4, line 56, "durin" should read --during--.

In column 4, line 60, "processin" should read --processing--.

In column 6, line 40, the formula should read:

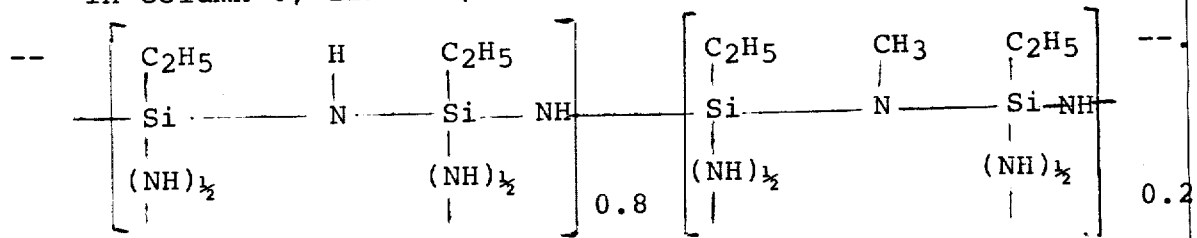

UNITED STATES PATENT AND TRADEMARK OFFICE
CERTIFICATE OF CORRECTION

PATENT NO. : 5,030,702
DATED : 7/9/91
INVENTOR(S) : Tilo Vaahs, Hans-Jerg Kleiner, Marcellus Feuckert and Martin Brück It is certified that error appears in the above-identified patent and that said Letters Patent is hereby corrected as shown below:

In claims 1, 5, 6 and 10 the formula should read:

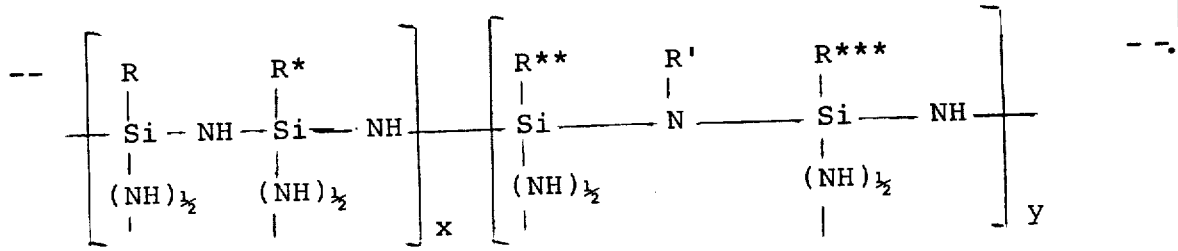

Signed and Sealed this

Twenty-third Day of February, 1993

Attest:

STEPHEN G. KUNIN

*Attesting Officer*  *Acting Commissioner of Patents and Trademarks*